April 20, 1926.
A. E. THATCHER
PLUMBER'S TRAP
Filed Dec. 10, 1920
1,581,478
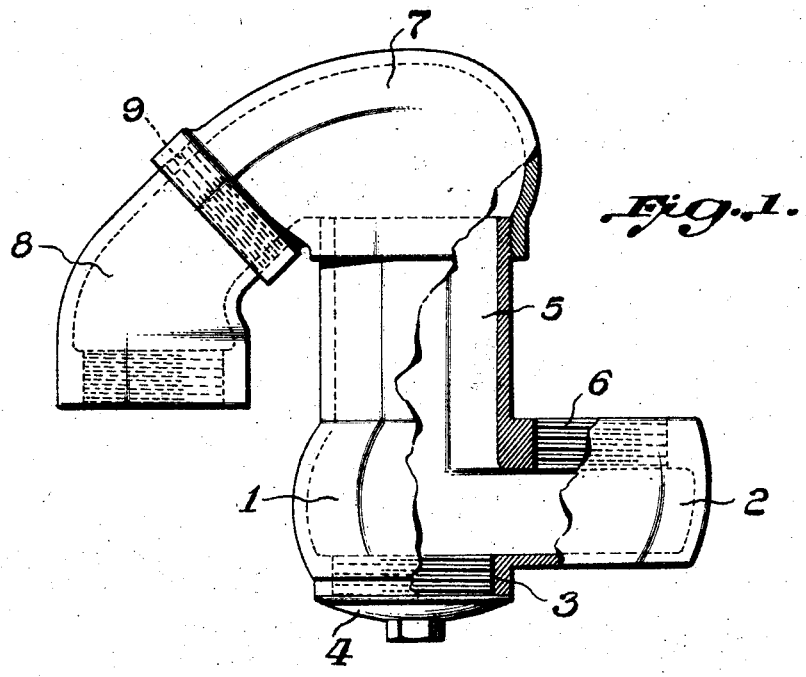
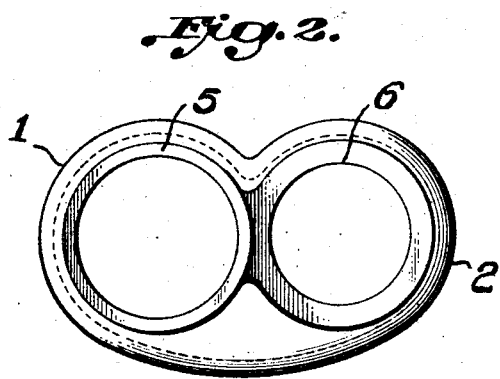
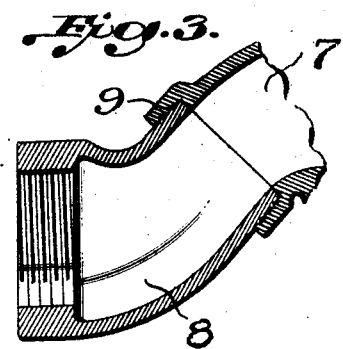
INVENTOR
Albert E. Thatcher,
BY
ATTORNEYS Patented Apr. 20, 1926.

1,581,478

UNITED STATES PATENT OFFICE.

ALBERT E. THATCHER, OF DETROIT, MICHIGAN.

PLUMBER'S TRAP.

Application filed December 10, 1920. Serial No. 429,626.

*To all whom it may concern:*

Be it known that I, ALBERT E. THATCHER, a citizen of the United States of America, residing at Detroit, in the county of Wayne and State of Michigan, have invented certain new and useful Improvements in Plumbers' Traps, of which the following is a specification, reference being had therein to the accompanying drawings.

This invention relates to plumbers' traps, and the primary object of my invention is to combine what is ordinarily known as a T trap which has connection with a wall and an S trap which may have connection with the floor, it being the present practice for plumbers to carry a stock of each type of trap, whereas with a trap in accordance with my invention, a plumber has, figuratively speaking, two in one.

Another object of this invention is to provide a trap that may be advantageously used in connection with a sink, basin or any structure located adjacent a wall or floor where connections must be established through either, the trap having a novel form of elbow which may be adjusted and correctly positioned to establish an outlet through the wall or floor.

A further object of my invention is to provide a trap of the above type that is simple in construction, durable, inexpensive to manufacture, and easy to maintain in a sanitary condition.

The above and other objects are attained by a mechanical construction that will be hereinafter specifically described and then claimed.

Reference will now be had to the drawing wherein—

Figure 1 is a side elevation of a trap, partly broken away and partly in section;

Fig. 2 is a plan of the body of the trap, and

Fig. 3 is a longitudinal sectional view of an adjustable connection for the trap.

The trap comprises somewhat globular body 1 having a globular inlet side extension 2 and the bottom of the globular body 1 has an outlet or cleaning opening 3 normally closed by a screw plug 4 and by removing this screw plug sediment and other accumulated matter within the trap body and its side extension may be removed and the trap flushed and maintained in a sanitary condition.

The top of the globular trap body 1 has a vertical tubular extension 5 and the top of the side extension 2 has an opening 6 with the walls thereof screwthreaded to receive a sink or other structure connection (not shown).

Mounted on the vertical tubular extension 5 of the trap body is a goose neck member 7 and connected to the goose neck member is an adjustable elbow connection 8 which is held relative to the connection 7 by screw threads 9 and in consequence of this connection the elbow may be adjusted or turned either for a floor connection as is apparent in Fig. 1 or for a wall connection as shown in Fig. 3. Any suitable packing may be used between the connections 7 and 8 to insure a non-leakable joint should there be any tendency of the elbow connection 8 to remain loose after being adjusted.

With the bottom of the trap comparatively flat it may be located in proximity to a floor and the vertical tubular connection 5 cooperates with the body 1 and its side extension 2 in providing a trap chamber of sufficient size so as not to require constant cleaning. The disposal of the side extension 2 relative to the body 1 also permits of these parts being made integral and cast to present a neat appearance with the symmetrical lines shown in Fig. 2.

I attach considerable importance to the elbow connection 8 of the goose neck connection 7 since the trap may be easily adjusted for either a wall or floor outlet, thus obviating the necessity of plumbers carrying in stock two different kinds of traps.

One embodiment of my invention has been illustrated, but it is to be understood that the various connections may be changed as to size and shape, without departing from the scope of the appended claims.

What I claim is:—

1. A trap for connection with a floor or wall pipe, comprising a main trap body provided at its upper end with a vertically disposed outlet and screw threads about the axis thereof, a cap having a retroverted way provided with screw threads about the axis of the inlet of said way for engagement with the threads of said trap body, whereby the cap may be swung about the axis of the outlet way of said trap body, and provided with screw threads about the axis of the outlet of said way, said way retroverting so as to dispose its inlet and outlet with their axes at an acute angle of 45°, and a fitting having a way and provided with screw threads about the inlet thereof adapted for cooperation with the threads of said cap about the axis of the outlet thereof, said fitting having its inlet and outlet of its way disposed with their axes at 135°, substantially as and for the purpose set forth.

2. A trap for connection with a floor or wall, pipe, comprising a main trap body provided at its upper end with a vertically disposed outlet, a cap having a retroverted way and disposed for connection with said trap body at the outlet thereof whereby the cap may be swung about the axis of the outlet way of said trap body, the way of said cap retroverting so as to dispose its inlet and outlet with their axes at an acute angle of 45°, and a fitting having a way, the inlet of which is adapted for connection with the outlet way of said cap, the way of said fitting being disposed with the axes of its inlet and outlet at an angle of 135°, substantially as and for the purpose set forth.

In testimony whereof I affix my signature.

ALBERT E. THATCHER.